United States Patent
Syu

(10) Patent No.: US 11,774,715 B2
(45) Date of Patent: Oct. 3, 2023

(54) LENS ASSEMBLY

(71) Applicants: Sintai Optical (Shenzhen) Co., Ltd., ShenZhen (CN); Asia Optical Co., Inc., Taichung (TW)

(72) Inventor: Rong-Shun Syu, Taichung (TW)

(73) Assignees: SINTAI OPTICAL (SHENZHEN) CO., LTD., Shenzhen (CN); ASIA OPTICAL CO., INC., Shenzhen (CN)

( * ) Notice: Subject to any disclaimer, the term of this patent is extended or adjusted under 35 U.S.C. 154(b) by 232 days.

(21) Appl. No.: 17/194,446

(22) Filed: Mar. 8, 2021

(65) Prior Publication Data
US 2021/0356707 A1 Nov. 18, 2021

(51) Int. Cl.
*G02B 13/00* (2006.01)
*G02B 9/12* (2006.01)
*G02B 27/00* (2006.01)

(52) U.S. Cl.
CPC .......... *G02B 13/0035* (2013.01); *G02B 9/12* (2013.01); *G02B 27/0025* (2013.01)

(58) Field of Classification Search
CPC ... G02B 13/0035; G02B 9/12; G02B 27/0025
See application file for complete search history.

(56) References Cited

U.S. PATENT DOCUMENTS

| | | | |
|---|---|---|---|
| 8,531,781 B2 | 9/2013 | Orihara et al. | |
| 9,468,358 B2 | 10/2016 | Harada | |
| 11,029,487 B2 * | 6/2021 | Lai | G02B 9/08 |
| 2010/0232013 A1 | 9/2010 | Yin et al. | |
| 2012/0212839 A1 * | 8/2012 | Hsu | G02B 13/0035 |
| | | | 359/716 |

FOREIGN PATENT DOCUMENTS

| | | | |
|---|---|---|---|
| CN | 101833164 A | 9/2010 | |
| CN | 102449525 A | 5/2012 | |
| CN | 108592867 A | 9/2018 | |
| JP | 2010039261 A | 2/2010 | |
| JP | 2015060019 A | 3/2015 | |
| WO | WO-2011027622 A1 * | 3/2011 | A61B 1/00096 |

* cited by examiner

*Primary Examiner* — Alicia M Harrington
(74) *Attorney, Agent, or Firm* — McClure, Qualey & Rodack, LLP

(57) ABSTRACT

A lens assembly includes a first lens, a second lens, and a third lens. The first lens is with negative refractive power and includes a concave surface facing an image side. The second lens is with positive refractive power and includes a convex surface facing the image side. The third lens is with positive refractive power and includes a convex surface facing an object side. The first lens, the second lens, and the third lens are arranged in order from the object side to the image side along an optical axis. The lens assembly satisfies the following condition: $3.5 \leq R_{21}/f \leq 8$; wherein $R_{21}$ is a radius of curvature of an object side surface of the second lens and f is an effective focal length of the lens assembly.

17 Claims, 12 Drawing Sheets

LENS ASSEMBLY

BACKGROUND OF THE INVENTION

Field of the Invention

The invention relates to a lens assembly.

Description of the Related Art

Today's lens assemblies have the characteristics of miniaturization, larger field of view, and larger stop. However, due to the large incident angle, the brightness of the peripheral image is insufficient which is not conducive to night environment applications. Therefore, the lens assembly needs a new structure which can not only have high peripheral brightness but also achieve miniaturization, large field of view and large stop, to meet the requirements of night environment application.

BRIEF SUMMARY OF THE INVENTION

The invention provides a lens assembly to solve the above problems. The lens assembly of the invention is provided with characteristics of a decreased total lens length, an increased field of view, a decreased f-number, an increased brightness of periphery image, and still has a good optical performance.

The lens assembly in accordance with an exemplary embodiment of the invention includes a first lens, a second lens, and a third lens. The first lens is with negative refractive power and includes a concave surface facing an image side. The second lens is with positive refractive power and includes a convex surface facing the image side. The third lens is with positive refractive power and includes a convex surface facing an object side. The first lens, the second lens, and the third lens are arranged in order from the object side to the image side along an optical axis. The lens assembly satisfies the following condition: $3.5 \leq R_{21}/f \leq 8$; wherein $R_{21}$ is a radius of curvature of an object side surface of the second lens and f is an effective focal length of the lens assembly.

In another exemplary embodiment, the first lens further includes a convex surface facing the object side, the second lens further includes another convex surface facing the object side, and the third lens further includes another convex surface facing the image side.

In yet another exemplary embodiment, at least one of the first lens, the second lens, and the third lens is an aspherical lens.

In another exemplary embodiment, the lens assembly satisfies the following condition: $14 \leq R_{11}/f \leq 20.5$; wherein $R_{11}$ is a radius of curvature of an object side surface of the first lens and f is the effective focal length of the lens assembly.

In yet another exemplary embodiment, the lens assembly satisfies the following condition: $2.4 \leq R_{11}/R_{21} \leq 3.9$; wherein $R_{11}$ is a radius of curvature of the object side surface of the first lens and $R_{21}$ is the radius of curvature of the object side surface of the second lens.

In another exemplary embodiment, the lens assembly satisfies the following condition: 8.4 mm $\leq R_{11}/(f_2/f_3) \leq 14.5$ mm; wherein $R_{11}$ is a radius of curvature of an object side surface of the first lens, $f_2$ is an effective focal length of the second lens, and $f_3$ is an effective focal length of the third lens.

In yet another exemplary embodiment, the lens assembly satisfies the following condition: 24 degrees/mm $\leq$ HFOV/$f_3 \leq 35$ degrees/min; wherein HFOV is a half field of view of the lens assembly and $f_3$ is an effective focal length of the third lens.

In another exemplary embodiment, the lens assembly further includes a stop disposed between the second lens and the third lens.

The lens assembly in accordance with another exemplary embodiment of the invention includes a first lens, a second lens, and a third lens. The first lens is with negative refractive power and includes a concave surface facing an image side. The second lens is with positive refractive power and includes a convex surface facing the image side. The third lens is with positive refractive power and includes a convex surface facing an object side. The first lens, the second lens, and the third lens are arranged in order from the object side to the image side along an optical axis. The lens assembly satisfies the following condition: $14 \leq R_{11}/f \leq 20.5$; wherein $R_{11}$ is a radius of curvature of an object side surface of the first lens and f is an effective focal length of the lens assembly.

In another exemplary embodiment, the first lens further includes a convex surface facing the object side, the second lens further includes another convex surface facing the object side, and the third lens further includes another convex surface facing the image side.

In yet another exemplary embodiment, at least one of the first lens, the second lens, and the third lens is an aspherical lens.

In another exemplary embodiment, the lens assembly satisfies the following condition: $2.4 \leq R_{11}/R_{21} \leq 3.9$; wherein $R_{11}$ is the radius of curvature of the object side surface of the first lens and $R_{21}$ is a radius of curvature of an object side surface of the second lens.

In yet another exemplary embodiment, the lens assembly satisfies the following condition: 8.4 mm $\leq R_{11}/(f_2/f_3) \leq 14.5$ mm; wherein $R_{11}$ is the radius of curvature of the object side surface of the first lens, $f_2$ is an effective focal length of the second lens, and $f_3$ is an effective focal length of the third lens.

In another exemplary embodiment, the lens assembly satisfies the following condition: 24 degrees/mm $\leq$ HFOV/$f_3 \leq 35$ degrees/mm wherein HFOV is a half field of view of the lens assembly and $f_3$ is an effective focal length of the third lens.

In yet another exemplary embodiment, the lens assembly further includes a stop disposed between the second lens and the third lens.

The lens assembly in accordance with yet another exemplary embodiment of the invention includes a first lens, a second lens, and a third lens. The first lens is with negative refractive power and includes a concave surface facing an image side. The second lens is with positive refractive power and includes a convex surface facing the image side. The third lens is with positive refractive power and includes a convex surface facing an object side. The first lens, the second lens, and the third lens are arranged in order from the object side to the image side along an optical axis. The lens assembly satisfies the following condition: 8.4 mm $\leq R_{11}/(f_2/f_3) \leq 14.5$ mm; wherein $R_{11}$ is a radius of curvature of an object side surface of the first lens, $f_2$ is an effective focal length of the second lens, and $f_3$ is an effective focal length of the third lens.

In another exemplary embodiment, the first lens further includes a convex surface facing the object side, the second lens further includes another convex surface facing the object side, and the third lens further includes another convex surface facing the image side.

In yet another exemplary embodiment, the lens assembly satisfies the following condition: $2.4 \leq R_{11}/R_{21} \leq 3.9$; wherein $R_{11}$ is the radius of curvature of the object side surface of the first lens and $R_{21}$ is a radius of curvature of an object side surface of the second lens.

In another exemplary embodiment, the lens assembly satisfies the following condition: 24 degrees/mm≤HFOV/$f_3$≤35 degrees/mm, wherein HFOV is a half field of view of the lens assembly and $f_3$ is an effective focal length of the third lens.

In yet another exemplary embodiment, the lens assembly further includes a stop disposed between the second lens and the third lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
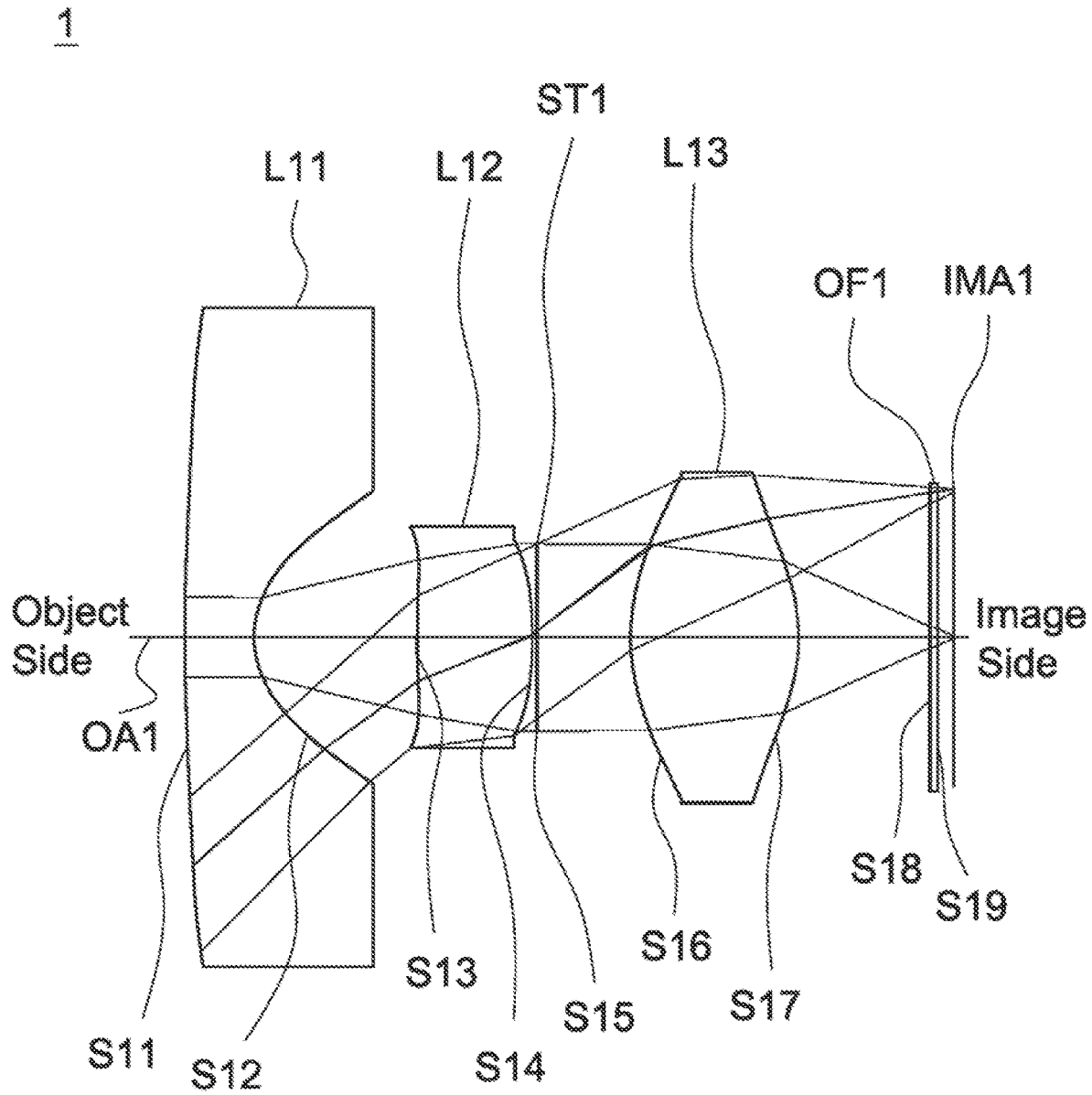
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, and a third lens. The first lens which is with negative refractive power and includes a concave surface facing an image side. The second lens which is with positive refractive power and includes a convex surface facing the image side. The third lens which is with positive refractive power and includes a convex surface facing an object side. The first lens, the second lens, and the third lens are arranged in order from the object side to the image side along an optical axis. The lens assembly satisfies the following condition: $3.5 \leq R_{21}/f \leq 8$; wherein $R_{21}$ is a radius of curvature of an object side surface of the second lens and f is an effective focal length of the lens assembly.

The present invention provides another lens assembly including a first lens, a second lens, and a third lens. The first lens which is with negative refractive power and includes a concave surface facing an image side. The second lens which is with positive refractive power and includes a convex surface facing the image side. The third lens which is with positive refractive power and includes a convex surface facing an object side. The first lens, the second lens, and the third lens are arranged in order from the object side to the image side along an optical axis, The lens assembly satisfies the following condition: $14 \leq R_{11}/f \leq 20.5$; wherein $R_{11}$ is a radius of curvature of an object side surface of the first lens and f is an effective focal length of the lens assembly.

The present invention provides yet another lens assembly including a first lens, a second lens, and a third lens. The first lens which is with negative refractive power and includes a concave surface facing an image side. The second lens which is with positive refractive power and includes a convex surface facing the image side. The third lens which is with positive refractive power and includes a convex surface facing an object side. The first lens, the second lens, and the third lens are arranged in order from the object side to the image side along an optical axis. The lens assembly satisfies the following condition: 8.4 mm≤$R_{11}/(f_2/f_3)$≤14.5 mm; wherein $R_{11}$ is a radius of curvature of an object side surface of the first lens, $f_2$ is an effective focal length of the second lens, and $f_3$ is an effective focal length of the third lens.

Referring to Table 1, Table 2, Table 4, Table 5, Table 7, and Table 8, wherein Table 1, Table 4, and Table 7 show optical specification in accordance with a first, second, and third embodiments of the invention respectively and Table 2, Table 5, and Table 8 show aspheric coefficient of each aspheric lens in Table 1, Table 4, and Table 7 respectively.

Figure 3:
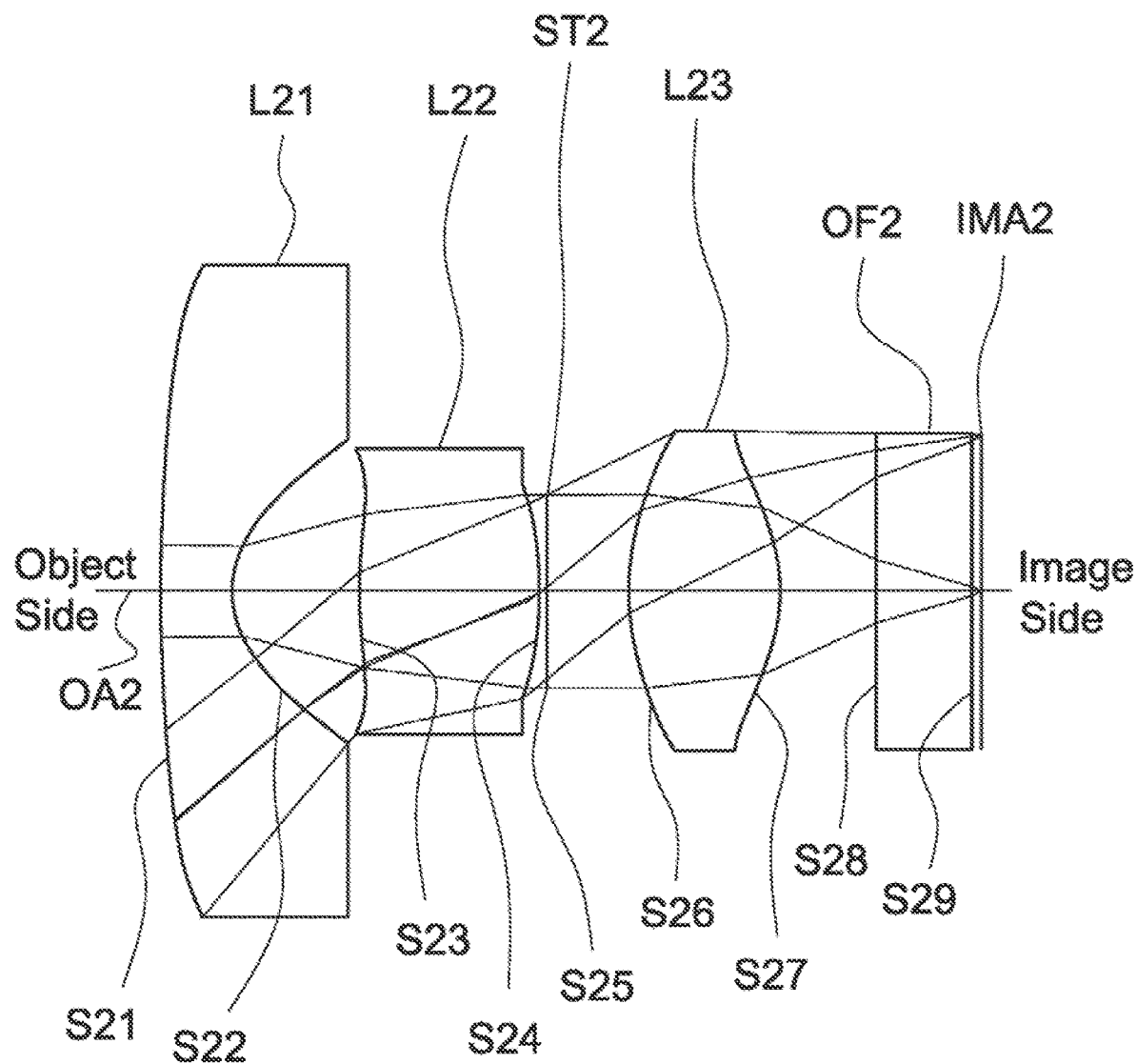
FIG. 3 is a lens layout and optical path diagram of a lens assembly in accordance with a second embodiment of the invention.
Figure 5:
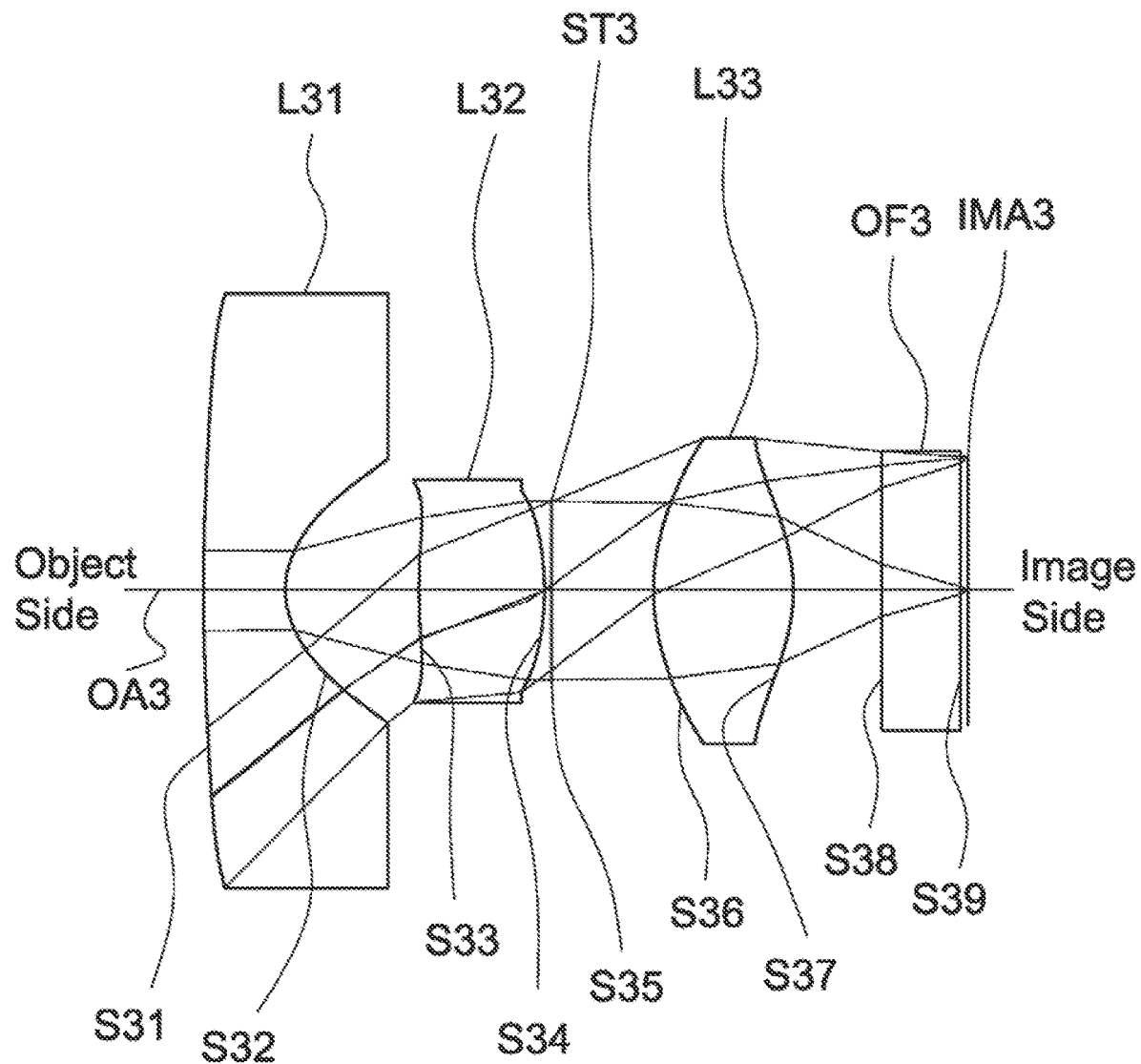
FIG. 5 is a lens layout and optical path diagram of a lens assembly in accordance with a third embodiment of the invention.

FIG. 1, FIG. 3, and FIG. 5 are lens layout and optical path diagrams of the lens assemblies in accordance with the first, second, and third embodiments of the invention respectively.

The first lenses L11, L21, L31 are meniscus lenses with negative refractive power, wherein the object side surfaces S11, S21, S31 are convex surfaces which can effectively increase the maximum half field of view, the image side surfaces S12, S22, S32 are concave surfaces, and the object side surfaces S11, S21, S31 and the image side surfaces S12, S22, S32 are aspheric surfaces.

The second lenses L12, L22, L32 are biconvex lenses with positive refractive power, wherein the object side surfaces S13, S23, S33 are convex surfaces which can further decrease the light angle to avoid too large chief ray angle, the image side surfaces S14, S24, S34 are convex surfaces, and the object side surfaces S13, S23, S33 and the image side surfaces S14, S24, S34 are aspheric surfaces.

The third lenses L13, L23, L33 are biconvex lenses with positive refractive power, wherein the object side surfaces S16, S26, S36 are convex surfaces which can decrease the angle of the light of the maximum half field of view incident on the image plane, and the object side surfaces S16, S26, S36 and the image side surfaces S17, S27, S37 are aspheric surfaces.

In addition, the wide-angle lens assemblies 1, 2, 3 satisfy at least one of the following conditions:

$$3.5 \leq R_2/f \leq 8; \tag{1}$$

$$24 \text{ degrees/mm} \leq HFOV/f_3 \leq 35 \text{ degrees/mm}; \tag{2}$$

$$14 \leq R_{11}/f \leq 20.5; \tag{3}$$

$$8.4 \text{ mm} \leq R_{11}/(f_2/f_3) \leq 14.5 \text{ mm}; \tag{4}$$

$$2.4 \leq R_{11}/R_{21} \leq 3.9 \tag{5}$$

wherein is a radius of curvature of the objet side surfaces S11, S21, S31 of the first lenses L11, L21, L31 for the first to third embodiments, $R_{21}$ is a radius of curvature of the objet side surfaces S13, S23, S33 of the second lenses L12, L22, L32 for the first to third embodiments, f is an effective focal length of the lens assemblies 1, 2, 3 for the first to third embodiments, $f_2$ is an effective focal length of the second lenses L12, L22, L32 for the first to third embodiments, $f_3$ is an effective focal length of the third lenses L13, L23, L33 for the first to third embodiments, and HFOV is a half field of view of the lens assemblies 1, 2, 3 for the first to third embodiments. With the lens assemblies 1, 2, 3 satisfying at least one of the above conditions (1)-(5), the total lens length can be effectively decreased, the field of view can be effectively increased, the weight can be effectively decreased, the brightness of the peripheral image can be effectively increased, and the aberration can be effectively corrected.

When the conditions (1), (2): $3.5 \leq R_{21}f \leq 8$, 24 degrees/mm $\leq HFOV/f_3 \leq 35$ degrees/mm are satisfied, the mass production capacity of the third lens can be improved and $R_{21}$ will decrease as the half field of view becomes larger so that $R_{21}$ has the ability to converge the light of the maximum half field of view.

When the condition (3): $14 \leq R_{11}/f \leq 20.5$ is satisfied, the processing yield of the first lens can be improved.

When the conditions (4), (5): 8.4 mm $\leq R_{11}/(f_2/f_3) \leq 14.5$ mm, $2.4 \leq R_{11}/R_{21} \leq 3.9$ are satisfied, by way of the good balance between $R_{11}$ and $(f_2/f_3)$ and between $R_{11}$ and $R_{21}$, the brightness of the peripheral image of the lens assembly can be increased, the distortion can be reduced, and the spherical aberration caused by the large stop can be reduced to improve the image quality.

When the stop is disposed between the second lens and the third lens, the diameter of the stop can be effectively increased to decrease the total lens length, the field of view can be effectively increased, and the brightness of the peripheral image can be increased so that the aberration can be reduced.

A detailed description of a lens assembly in accordance with a first embodiment of the invention is as follows. Referring to FIG. 1, the lens assembly 1 includes a first lens L11, a second lens L12, a stop ST1, a third lens L13, and an optical filter OF1, all of which are arranged in order from an object side to an image side along an optical axis OA1. In operation, an image of light rays from the object side is formed at an image plane IMAL1.

According to the foregoing, wherein: both of the object side surface S18 and image side surface S19 of the optical filter OF1 are plane surfaces.

With the above design of the lenses, stop ST1, and at least any one of the conditions (1)-(5) satisfied, the lens assembly 1 can have an effective decreased total lens length, an effective increased field of view, an effective decreased weight, an effective increased brightness of the peripheral image, and an effective corrected aberration.

Table 1 shows the optical specification of the lens assembly 1 in FIG. 1.

TABLE 1

| Effective Focal Length = 4.12 mm | | | | | | |
|---|---|---|---|---|---|---|
| F-number = 1.21 | | | | | | |
| Total Lens Length = 8.91 mm | | | | | | |
| Field of View = 74.90 degrees | | | | | | |
| Surface Number | Radius of Curvature (mm) | Thickness (mm) | Nd | Vd | Effective Focal Length (mm) | Remark |
| S11 | 20.74 | 0.80 | 1.54 | 56 | −2.16 | The First Lens L11 |
| S12 | 1.05 | 1.89 | | | | |
| S13 | 8.25 | 1.34 | 1.64 | 24 | 4.29 | The Second Lens L12 |
| S14 | −4.33 | 0.06 | | | | |
| S15 | ∞ | 1.08 | | | | Stop ST1 |
| S16 | 2.32 | 1.95 | 1.54 | 56 | 2.33 | The Third Lens L13 |
| S17 | −1.96 | 1.52 | | | | |
| S18 | ∞ | 0.09 | 1.52 | 64 | | Optical Filter OF1 |
| S19 | ∞ | 0.18 | | | | |

The aspheric surface sag z of each aspheric lens in table 1 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each aspheric lens are shown in Table 2.

TABLE 2

| Surface Number | k | A | B | C | D |
|---|---|---|---|---|---|
| S11 | 0.000E+00 | −2.517E−03 | 1.730E−04 | −3.210E−06 | 2.962E−09 |
| S12 | −9.010E−01 | −9.251E−03 | 1.416E−02 | −6.234E−03 | 4.277E−04 |
| S13 | 0.000E+00 | −3.479E−02 | −1.909E−02 | 0.000E+00 | 0.000E+00 |
| S14 | 3.085E+00 | −1.988E−02 | −2.438E−02 | 1.417E−02 | −2.119E−03 |
| S16 | −5.206E+00 | 1.0070−02 | −3.284E−04 | −6.094E−05 | −3.132E−05 |
| S17 | −1.693E+00 | 3.322E−02 | −6.765E−03 | 1.614E−03 | −1.930E−04 |

Table 3 shows the parameters and condition values for conditions (1)-(5) in accordance with the first embodiment of the invention. It can be seen from Table 3 that the lens assembly 1 of the first embodiment satisfies the conditions (1)-(5),

TABLE 3

| HFOV | 74.90 degrees | $R_{21}/f$ | 7.40 | $HFOV/f_3$ | 32.14 degrees/mm |
|---|---|---|---|---|---|
| $R_{11}/f$ | 18.60 | $R_{11}/(f_2/f_3)$ | 11.26 mm | $R_{11}/R_{21}$ | 2.51 |

Figure 2A:
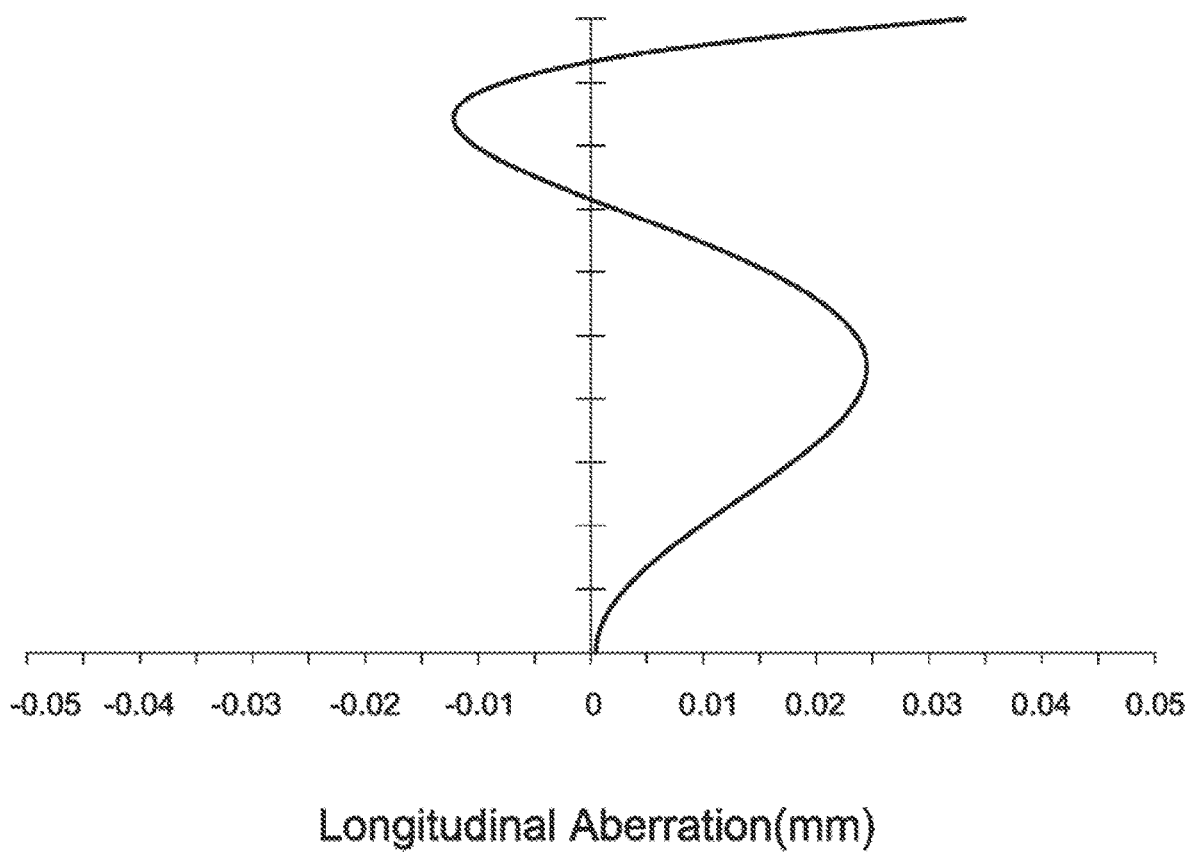
FIG. 2A depicts a longitudinal aberration diagram of the lens assembly in accordance with the first embodiment of the invention.
Figure 2B:
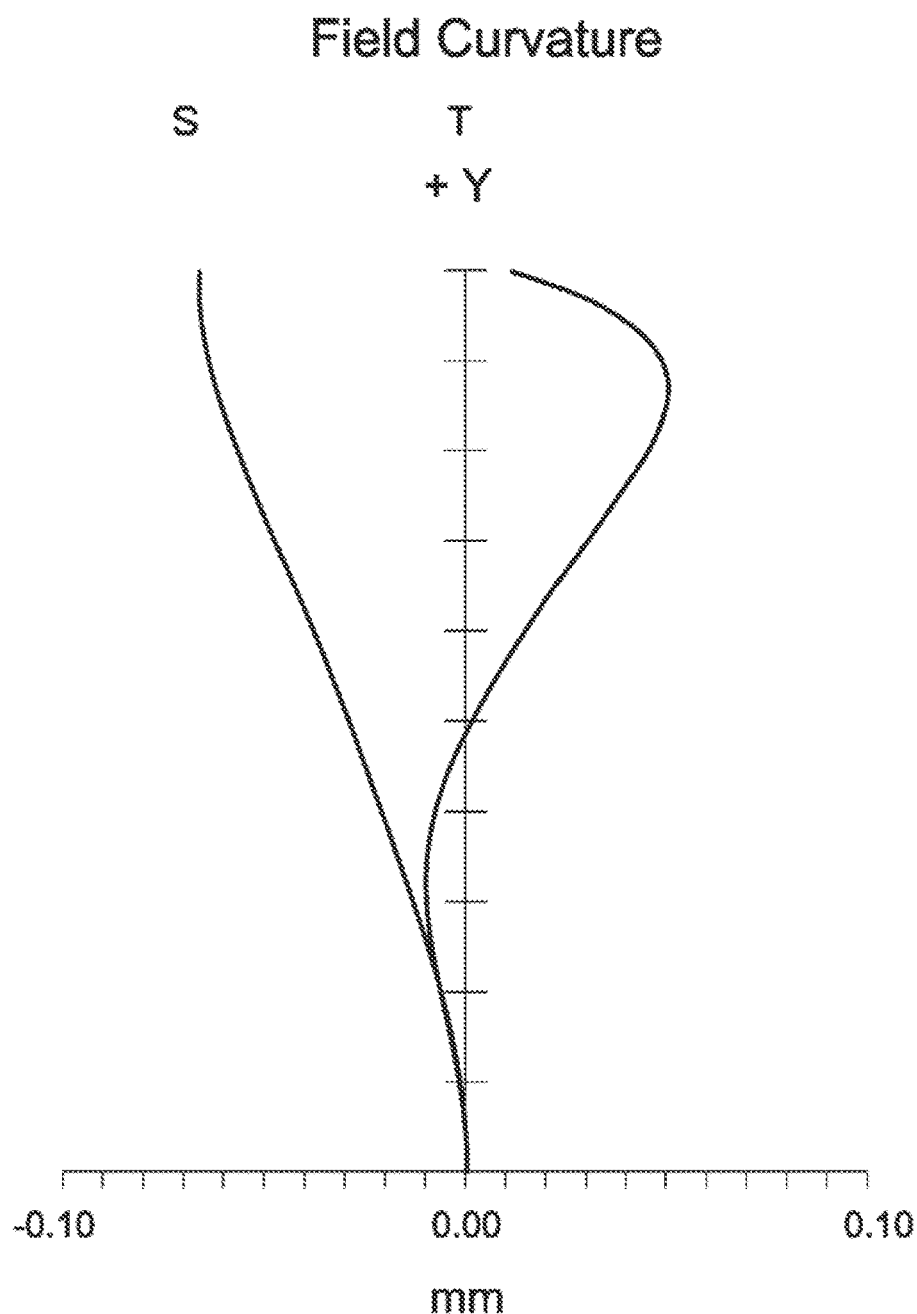
FIG. 2B is a field curvature diagram of the lens assembly in accordance with the first embodiment of the invention.
Figure 2C:
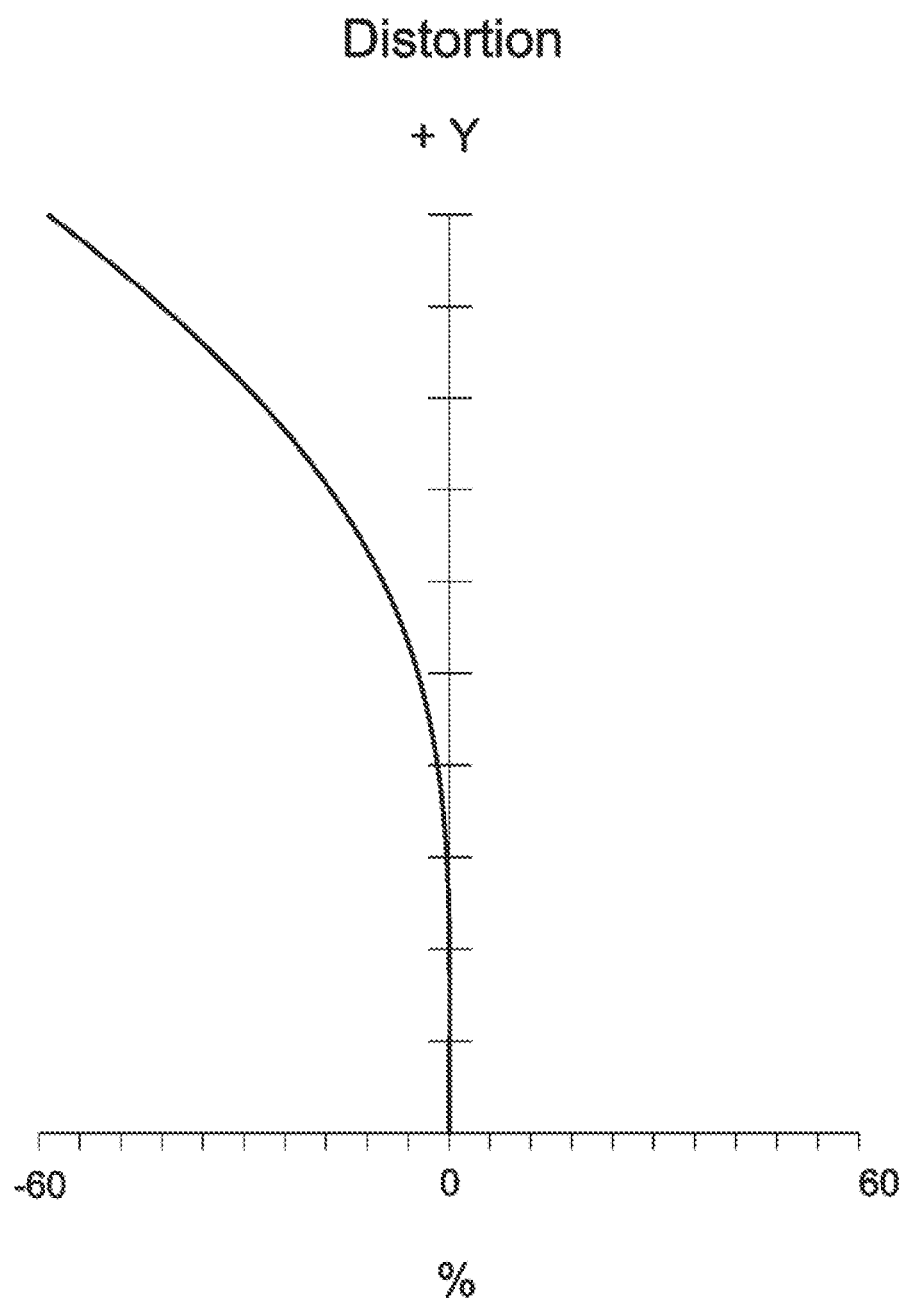
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C.

It can be seen from FIG. 2A that the longitudinal aberration in the lens assembly 1 of the first embodiment ranges from −0.015 mm to 0.025 mm. It can be seen from FIG. 2B that the field curvature of tangential direction and sagittal direction in the lens assembly 1 of the first embodiment ranges from −0.07 mm to 0.07 mm. It can be seen from FIG. 2C that the distortion in the lens assembly 1 of the first embodiment ranges from −60% to 0%.

It is obvious that the longitudinal aberration, the field curvature, and the distortion of the lens assembly 1 of the first embodiment can be corrected effectively. Therefore, the lens assembly 1 of the first embodiment is capable of good optical performance.

Referring to FIG. 3, the lens assembly 2 includes a first lens L21, a second lens L22, a stop ST2, a third lens L23, and an optical filter OF2, all of which are arranged in order from an object side to an image side along an optical axis OA2. In operation, an image of light rays from the object side is formed at an image plane IMA2.

According to the foregoing, wherein: both of the object side surface S28 and image side surface S29 of the optical filter OF2 are plane surfaces.

With the above design of the lenses, stop ST2, and at least any one of the conditions (1)-(5) satisfied, the lens assembly 2 can have an effective decreased total lens length, an effective increased field of view, an effective decreased weight, an effective increased brightness of the peripheral image, and an effective corrected aberration.

Table 4 shows the optical specification of the lens assembly 2 in FIG. 3.

TABLE 4

Effective Focal Length = 1.20 mm
F-number = 1.23
Total Lens Length = 9.00 mm
Field of View = 63.00 degrees

| Surface Number | Radius of Curvature (mm) | Thickness (mm) | Nd | Vd | Effective Focal Length (mm) | Remark |
|---|---|---|---|---|---|---|
| S21 | 18.60 | 0.78 | 1.54 | 56 | −2.12 | The First Lens L21 |
| S22 | 1.07 | 1.40 | | | | |
| S23 | 4.90 | 1.97 | 1.64 | 24 | 4.80 | The Second Lens L22 |
| S24 | −4.85 | 0.09 | | | | |
| S25 | ∞ | 0.90 | | | | Stop ST2 |
| S26 | 2.60 | 1.66 | 1.54 | 56 | 2.39 | The Third Lens L23 |
| S27 | −1.87 | 1.06 | | | | |
| S28 | ∞ | 1.05 | 1.52 | 64 | | Optical Filter OF2 |
| S29 | ∞ | 0.10 | | | | |

The definition of aspheric surface sag z of each aspheric lens in table 4 is the same as that of in Table 1, and is not described here again.

In the second embodiment, the conic constant k and the aspheric coefficients A, B, C, D of each aspheric lens are shown in Table 5.

TABLE 5

| Surface Number | k | A | B | C | D |
|---|---|---|---|---|---|
| S21 | 0.000E+00 | −2.517E−03 | 1.730E−04 | −3.210E−06 | 2.962E−09 |
| S22 | −9.010E−01 | −9.251E−03 | 1.416E−02 | −6.234E−03 | 4.277E−04 |
| S23 | 0.000E+00 | −3.479E−02 | −1.909E−02 | 0.000E+00 | 0.000E+00 |
| S24 | 3.085E+00 | −1.988E−02 | −2.438E−02 | 1.417E−02 | −2.119E−03 |
| S26 | −5.206E+00 | 1.007E−02 | −3.284E−04 | −6.094E−05 | −3.132E−O5 |
| S27 | −1.693E+00 | 3.322E−02 | −6.765E−03 | 1.614E−03 | −1.930E−04 |

Table 6 shows the parameters and condition values for conditions (1)-(5) in accordance with the second embodiment of the invention. It can be seen from Table 6 that the lens assembly 2 of the second embodiment satisfies the conditions (1)-(5).

TABLE 6

| HFOV | 63.00 degrees | $R_{21}/f$ | 4.08 | $HFOV/f_3$ | 26.37 degrees/mm |
|---|---|---|---|---|---|
| $R_{11}/f$ | 15.50 | $R_{11}/(f_2/f_3)$ | 9.26 mm | $R_{11}/R_{21}$ | 3.80 |

Figure 4A:
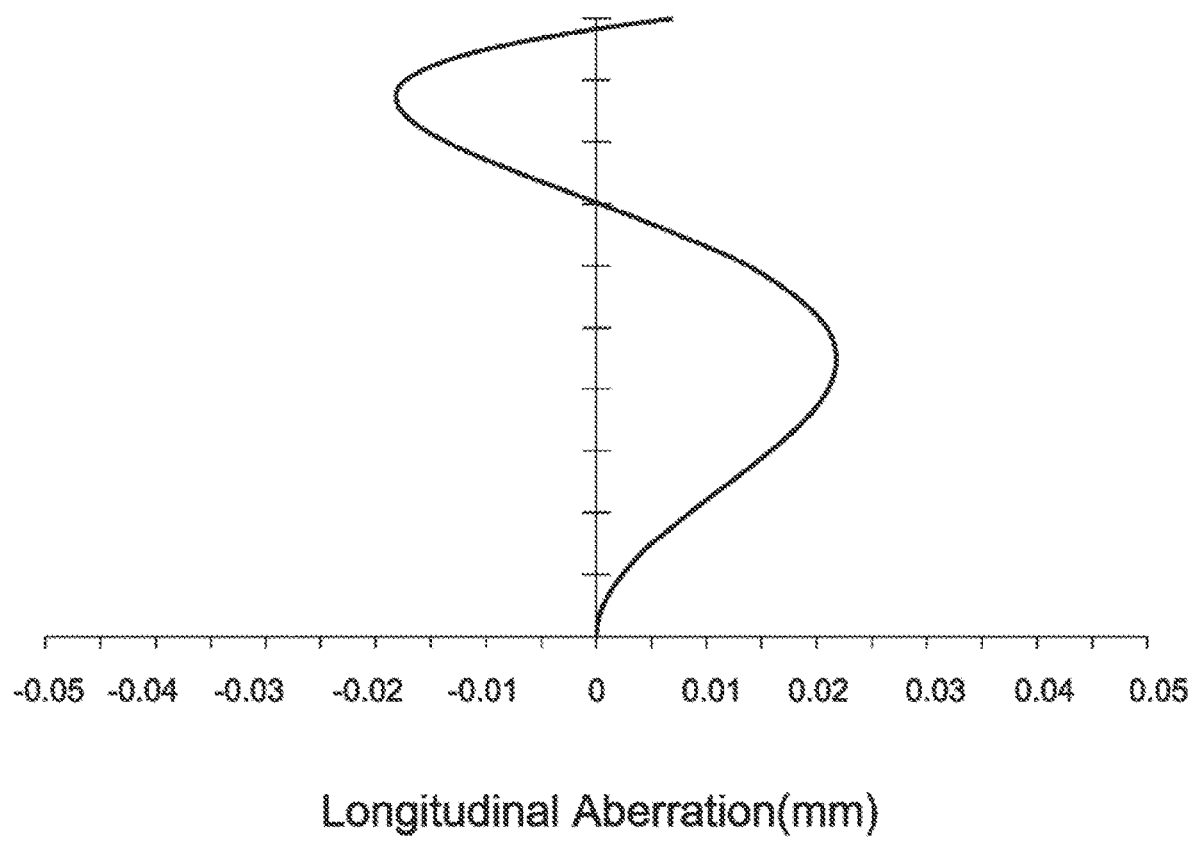
FIG. 4A depicts a longitudinal aberration diagram of the lens assembly in accordance with the second embodiment of the invention.
Figure 4B:
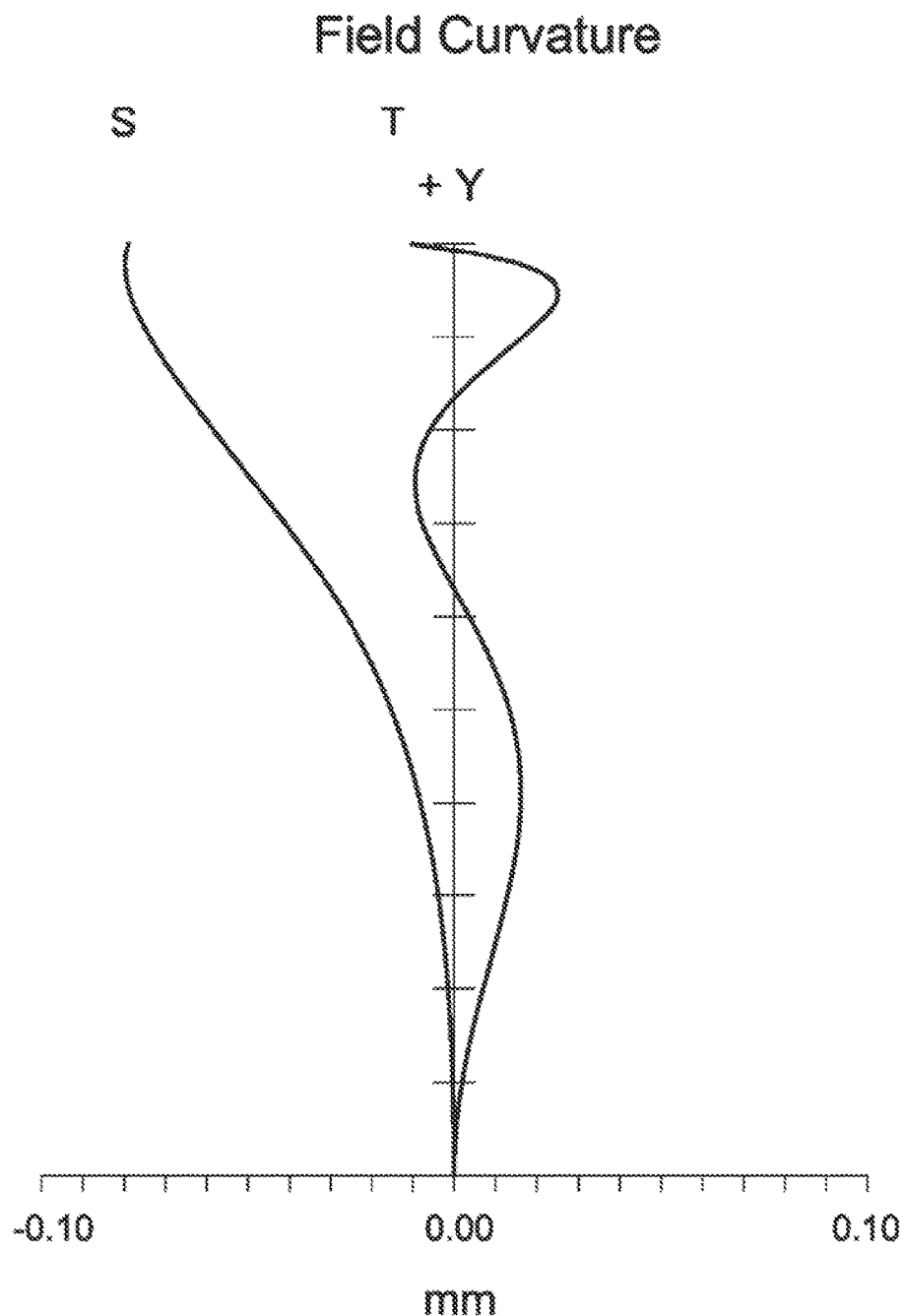
FIG. 4B is a field curvature diagram of the lens assembly in accordance with the second embodiment of the invention.
Figure 4C:
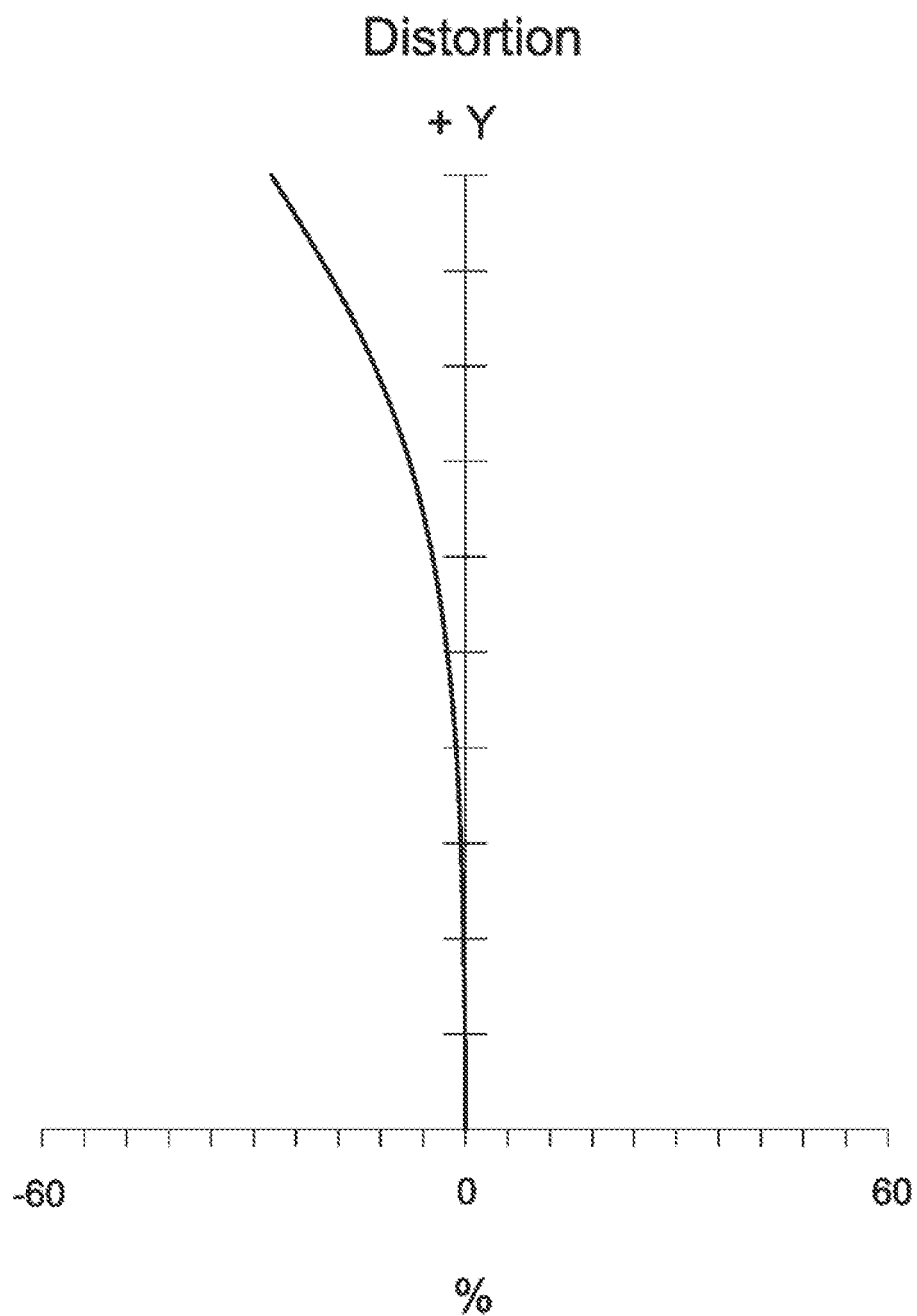
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C.

It can be seen from FIG. 4A that the longitudinal aberration in the lens assembly 2 of the second embodiment ranges from −0.02 mm to 0.02.5 mm. It can be seen from FIG. 4B that the field curvature of tangential direction and sagittal direction in the lens assembly 2 of the second embodiment ranges from −0.08 mm to 0.03 mm. It can be seen from FIG. 4C that the distortion in the lens assembly 2 of the second embodiment ranges from −30% to 0%.

It is obvious that the longitudinal aberration, the field curvature, and the distortion of the lens assembly 2 of the second embodiment can be corrected effectively. Therefore, the lens assembly 2 of the second embodiment is capable of good optical performance.

Referring to FIG. 5, the lens assembly 3 includes a first lens L31, a second lens L32, a stop ST3, a third lens L33, and an optical filter OF3, all of which are arranged in order from an object side to an image side along an optical axis OA3. In operation, an image of light rays from the object side is formed at an image plane IMA3.

According to the foregoing, wherein: both of the object side surface S38 and image side surface S39 of the optical filter OF3 are plane surfaces.

With the above design of the lenses, stop ST3, and at least any one of the conditions (1)-(5) satisfied, the lens assembly 3 can have an effective decreased total lens length, an effective increased field of view, an effective decreased weight, an effective increased brightness of the peripheral image, and an effective corrected aberration.

Table 7 shows the optical specification of the lens assembly 3 in FIG. 5.

TABLE 7

Effective Focal Length = 1.23 mm
F-number = 1.21
Total Lens Length = 9.81 mm
Field of View = 65.00 degrees

| Surface Number | Radius of Curvature (mm) | Thickness (mm) | Nd | Vd | Effective Focal Length (mm) | Remark |
|---|---|---|---|---|---|---|
| S31 | 23.55 | 1.06 | 1.54 | 56 | −2.20 | The First Lens L31 |
| S32 | 1.11 | 1.72 | | | | |
| S33 | 6.86 | 1.60 | 1.61 | 26 | 4.54 | The Second Lens L32 |
| S34 | −3.92 | 0.09 | | | | |
| S35 | ∞ | 1.31 | | | | Stop ST3 |
| S36 | 2.60 | 1.79 | 1.54 | 56 | 2.55 | The Third Lens L33 |
| S37 | −2.20 | 1.14 | | | | |
| S38 | ∞ | 1.00 | 1.52 | 64 | | Optical Filter OF3 |
| S39 | ∞ | 0.10 | | | | |

The definition of aspheric surface sag z of each aspheric lens in table 7 is the same as that of in Table 1, and is not described here again.

In the third embodiment, the conic constant k and the aspheric coefficients A, B, C, D of each aspheric lens are shown in Table 8.

TABLE 8

| Surface Number | k | A | B | C | D |
|---|---|---|---|---|---|
| S31 | 0.000E+00 | −1.656E−03 | 1.068E−04 | 4.452E−07 | −4.571E−08 |
| S32 | −9.468E−01 | 2.951E−03 | 2.521E−03 | −1.172E−03 | −7.881E−05 |
| S33 | −7.688E+00 | −2.287E−02 | −1.193E−02 | −1.062E−03 | 0.000E+00 |
| S34 | 0.000E+00 | −1.579E−02 | −1.370E−02 | 6.749E−03 | −1.108E−03 |
| S36 | −5.013E+00 | 7.051E−03 | 4.440E−04 | 4.830E−05 | −2.153E−05 |
| S37 | −1.549E+00 | 2.283E−02 | −2.774E−03 | 9.430E−04 | −1.035E−04 |

Table 9 shows the parameters and condition values for conditions (1)-(5) in accordance with the third embodiment of the invention. It can be seen from Table 9 that the lens assembly 3 of the third embodiment satisfies the conditions (1)-(5).

TABLE 9

| HFOV | 65.00 degrees | $R_{21}/f$ | 5.57 | $HFOV/f_3$ | 25.48 degrees/mm |
|---|---|---|---|---|---|
| $R_{11}/f$ | 19.15 | $R_{11}/(f_2/f_3)$ | 13.23 mm | $R_{11}/R_{21}$ | 3.43 |

Figure 6A:
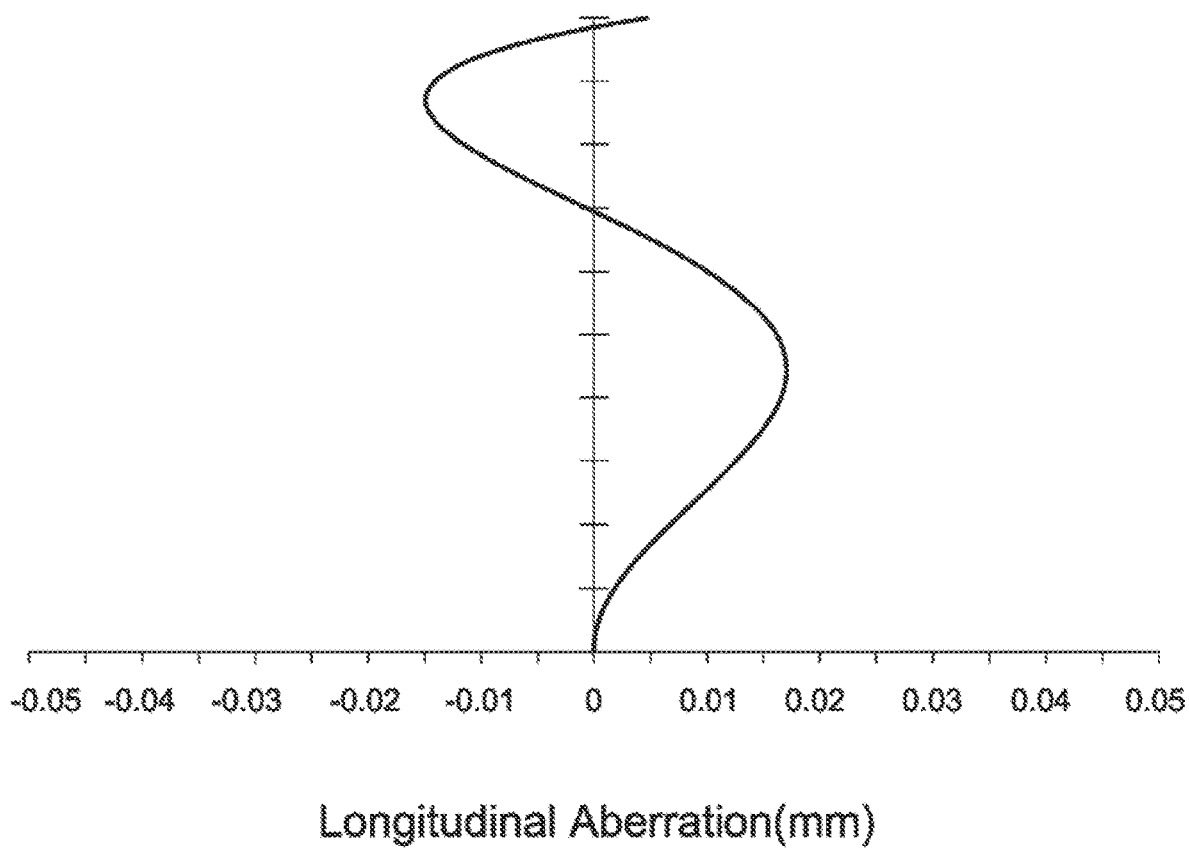
FIG. 6A depicts a longitudinal aberration diagram of the lens assembly in accordance with the third embodiment of the invention.
Figure 6B:
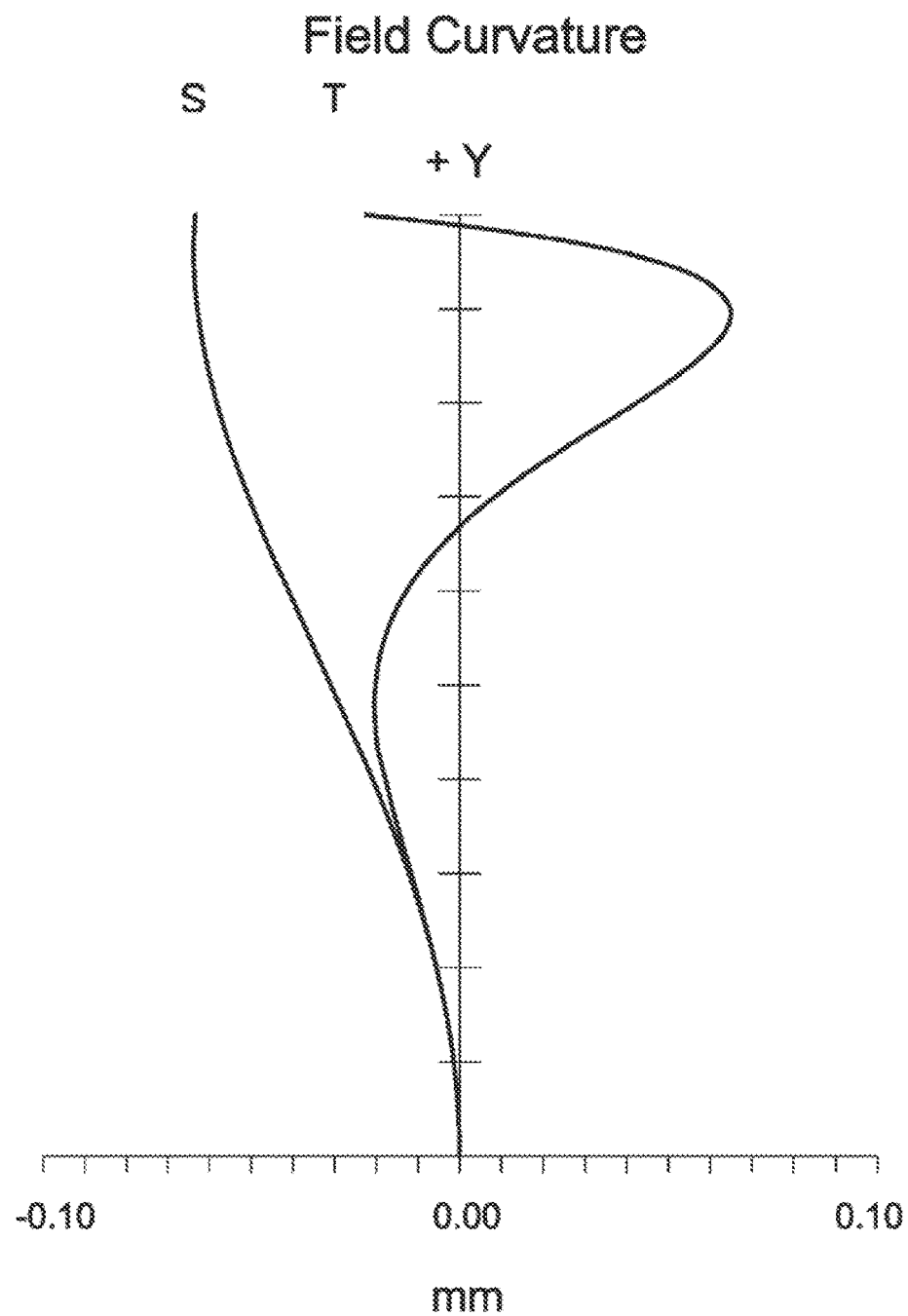
FIG. 6B is a field curvature diagram of the lens assembly in accordance with the third embodiment of the invention.
Figure 6C:
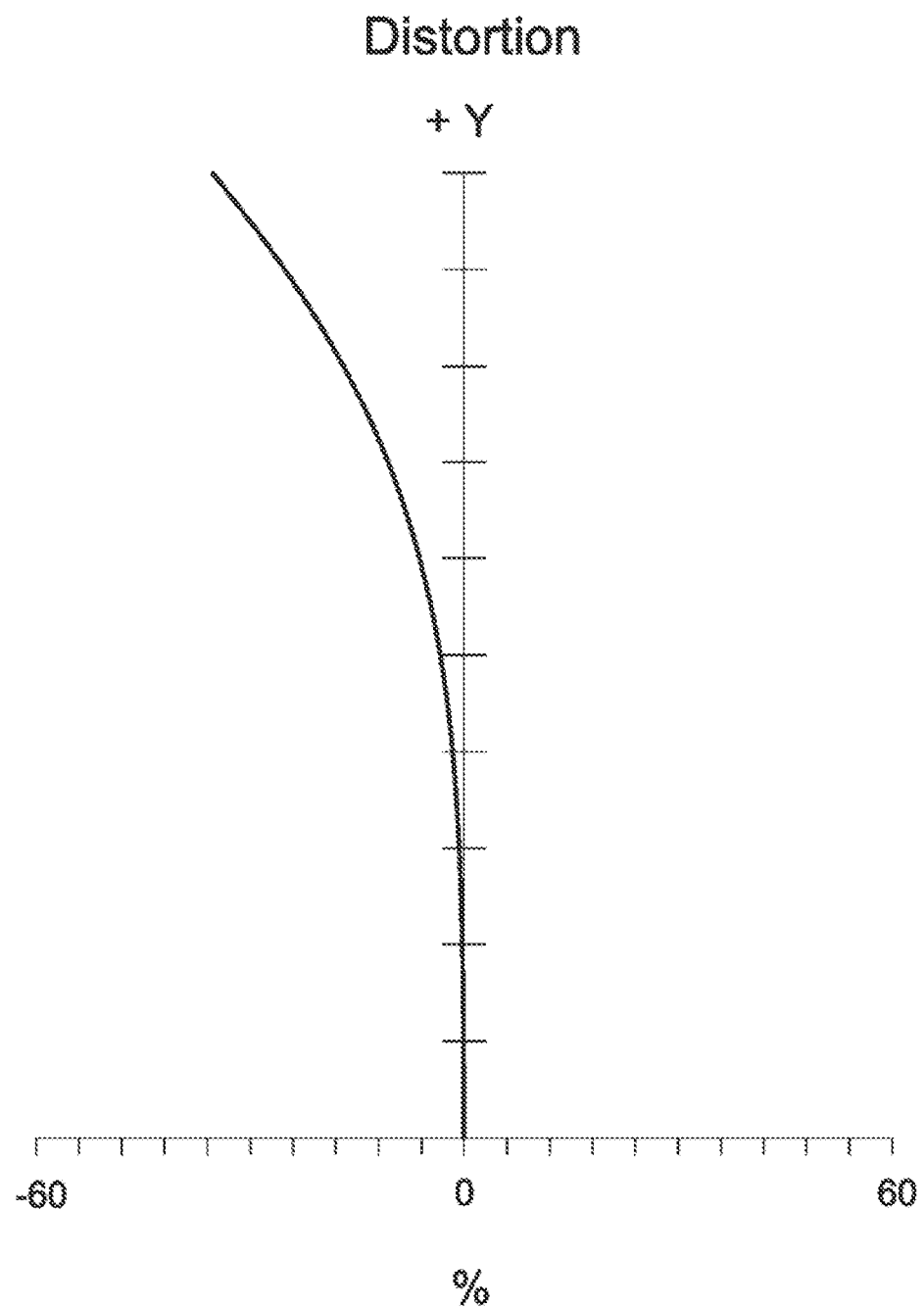
FIG. 6C is a distortion diagram of the lens assembly in accordance with the third embodiment of the invention.

By the above arrangements of the lenses and stop ST3, the lens assembly 3 of the third embodiment can meet the requirements of optical performance as seen in FIGS. 6A-6C.

It can be seen from FIG. 6A that the longitudinal aberration in the lens assembly 3 of the third embodiment ranges from −0.015 mm to 0.02 mm. It can be seen from FIG. 6B that the field curvature of tangential direction and sagittal direction in the lens assembly 3 of the third embodiment ranges from −0.07 mm to 0.07 mm. It can be seen from FIG. 6C that the distortion in the lens assembly 3 of the third embodiment ranges from −36% to 0%.

It is obvious that the longitudinal aberration, the field curvature, and the distortion of the lens assembly 3 of the third embodiment can be corrected effectively. Therefore, the lens assembly 3 of the third embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
a first lens which is with negative refractive power and comprises a concave surface facing an image side;
a second lens which is with positive refractive power and comprises a convex surface facing the image side; and
a third lens which is with positive refractive power and comprises a convex surface facing an object side;
wherein the first lens, the second lens, and the third lens are arranged in order from the object side to the image side along an optical axis;
wherein the lens assembly satisfies the following conditions:

$3.5 \leq R_{21}/f \leq 8$;

$14 \leq R_{11}/f \leq 20.5$;

wherein $R_{11}$ is a radius of curvature of an object side surface of the first lens, $R_{21}$ is a radius of curvature of an object side surface of the second lens and f is an effective focal length of the lens assembly.

2. The lens assembly as claimed in claim 1, wherein:
the first lens further comprises a convex surface facing the object side;
the second lens further comprises another convex surface facing the object side; and
the third lens further comprises another convex surface facing the image side.

3. The lens assembly as claimed in claim 2, wherein at least one of the first lens, the second lens, and the third lens is an aspherical lens.

4. The lens assembly as claimed in claim 1, wherein the lens assembly satisfies the following condition:

$2.4 \leq R_{11}/R_{21} \leq 3.9$;

wherein $R_{11}$ is the radius of curvature of the object side surface of the first lens and $R_{21}$ is the radius of curvature of the object side surface of the second lens.

5. The lens assembly as claimed in claim 1, wherein the lens assembly satisfies the following condition:

$8.4$ mm $\leq R_{11}/(f_2/f_3) \leq 14.5$ mm;

wherein $R_{11}$ is a radius of curvature of an object side surface of the first lens, $f_2$ is an effective focal length of the second lens, and $f_3$ is an effective focal length of the third lens.

6. The lens assembly as claimed in claim 1, wherein the lens assembly satisfies the following condition:

24degrees/mm $\leq$ HFOV/$f_3$ $\leq$ 35degrees/mm;

wherein HFOV is a half field of view of the lens assembly and $f_3$ is an effective focal length of the third lens.

7. The lens assembly as claimed in claim 1, further comprising a stop disposed between the second lens and the third lens.

8. A lens assembly comprising:
a first lens which is with negative refractive power and comprises a concave surface facing an image side;
a second lens which is with positive refractive power and comprises a convex surface facing the image side; and
a third lens which is with positive refractive power and comprises a convex surface facing an object side;
wherein the first lens, the second lens, and the third lens are arranged in order from the object side to the image side along an optical axis;

wherein the lens assembly satisfies the following condition:

$14 \leq R_{11}/f \leq 20.5$;

$2.4 < R_{11}/R_{21} \leq 3.9$;

wherein $R_{11}$ is a radius of curvature of an object side surface of the first lens, $R_{21}$ is a radius of curvature of an object side surface of the second lens and f is an effective focal length of the lens assembly.

9. The lens assembly as claimed in claim 8, wherein:
the first lens further comprises a convex surface facing the object side;
the second lens further comprises another convex surface facing the object side; and
the third lens further comprises another convex surface facing the image side.

10. The lens assembly as claimed in claim 9, wherein at least one of the first lens, the second lens, and the third lens is an aspherical lens.

11. The lens assembly as claimed in claim 8, wherein the lens assembly satisfies the following condition:

$8.4 \text{ mm} \leq R_{11}/(f_2/f_3) \leq 14.5 \text{ mm}$;

wherein $R_{11}$ is the radius of curvature of the object side surface of the first lens, $f_2$ is an effective focal length of the second lens, and $f_3$ is an effective focal length of the third lens.

12. The lens assembly as claimed in claim 8, wherein the lens assembly satisfies the following condition:

24 degrees/$mm \leq$ HFOV/$f_3 \leq$ 35 degrees/$mm$;

wherein HFOV is a half field of view of the lens assembly and $f_3$ is an effective focal length of the third lens.

13. The lens assembly as claimed in claim 8, further comprising a stop disposed between the second lens and the third lens.

14. A lens assembly comprising:
a first lens which is with negative refractive power and comprises a concave surface facing an image side;
a second lens which is with positive refractive power and comprises a convex surface facing the image side; and
a third lens which is with positive refractive power and comprises a convex surface facing an object side;
wherein the first lens, the second lens, and the third lens are arranged in order from the object side to the image side along an optical axis;
wherein the lens assembly satisfies the following condition:

$8.4 \text{ mm} \leq R_{11}/(f_2/f_3) \leq 14.5 \text{ mm}$;

$14 \leq R_{11}/f \leq 20.5$;

wherein $R_{11}$ is a radius of curvature of an object side surface of the first lens, f is an effective focal length of the lens assembly, $f_2$ is an effective focal length of the second lens, and $f_3$ is an effective focal length of the third lens.

15. The lens assembly as claimed in claim 14, wherein:
the first lens further comprises a convex surface facing the object side;
the second lens further comprises another convex surface facing the object side; and
the third lens further comprises another convex surface facing the image side.

16. The lens assembly as claimed in claim 14, wherein the lens assembly satisfies the following condition:

24 degrees/$mm \leq$ HFOV/$f_3 \leq$ 35 degrees/$mm$;

wherein HFOV is a half field of view of the lens assembly and $f_3$ is an effective focal length of the third lens.

17. The lens assembly as claimed in claim 14, further comprising a stop disposed between the second lens and the third lens.

\* \* \* \* \*